US012808451B2

(12) United States Patent
Dörfler et al.

(10) Patent No.: US 12,808,451 B2
(45) Date of Patent: Nov. 24, 2026

(54) LIFTING ELEMENT AND ADJUSTMENT DEVICE

(71) Applicant: Alfmeier Präzision SE, Treuchtlingen (DE)

(72) Inventors: Erich Dörfler, Treuchtlingen (DE); Markus Köpfer, Treuchtlingen (DE)

(73) Assignee: Alfmeier Präzision SE, Treuchtlingen (DE)

( * ) Notice: Subject to any disclaimer, the term of this patent is extended or adjusted under 35 U.S.C. 154(b) by 0 days.

(21) Appl. No.: 18/990,021

(22) Filed: Dec. 20, 2024

(65) Prior Publication Data

US 2025/0189055 A1 Jun. 12, 2025

Related U.S. Application Data

(63) Continuation of application No. 16/833,996, filed on Mar. 30, 2020, now abandoned.

(30) Foreign Application Priority Data

Apr. 2, 2019 (DE) ..................... 20 2019 101 901.8
Mar. 23, 2020 (DE) ..................... 10 2020 107 952.4

(51) Int. Cl.
*F16K 31/02* (2006.01)
*B60N 2/90* (2018.01)
*F16K 11/22* (2006.01)
*F16K 27/02* (2006.01)

(52) U.S. Cl.
CPC ............ *F16K 31/025* (2013.01); *B60N 2/914* (2018.02); *F16K 11/22* (2013.01); *F16K 27/02* (2013.01)

(58) Field of Classification Search
CPC ...... F16K 31/002; F16K 31/003; F16K 31/02; F16K 31/025; F16K 31/0655; F16K 11/10; F16K 11/20; F16K 11/22; F16K 27/02; A47C 4/54; A47C 7/142; A47C 7/467; B60C 29/00; B60C 29/04; B60C 29/06; B60N 2/7082; B60N 2/665; B60N 2/914; B60N 2/7088
See application file for complete search history.

(56) References Cited

U.S. PATENT DOCUMENTS 3,330,598 A * 7/1967 Whiteside ............ B60N 2/0284 297/284.6
3,442,483 A * 5/1969 Schwartz ........... G05D 23/1921 137/877
3,613,732 A * 10/1971 Willson .................. F03G 7/066 60/527
3,625,002 A * 12/1971 Davis .................... F16K 31/025 60/528
3,732,944 A * 5/1973 Kendall ................. B60N 2/002 296/68.1
4,769,887 A * 9/1988 Shopsky ............... F16K 31/002 29/890.13

(Continued)

*Primary Examiner* — Kenneth Rinehart
*Assistant Examiner* — Jonathan J Waddy
(74) *Attorney, Agent, or Firm* — JK Intellectual Property Law, PA

(57) ABSTRACT

A valve element can selectively seal or open two ports. The valve element includes a base plate, first and second actuators operated by SMA wires to selectively move sealing elements via deflection of return elements such as leaf springs. The valve element can used in a lift elements or actuators in components of vehicles.

21 Claims, 16 Drawing Sheets

(56) References Cited

Figure 1:
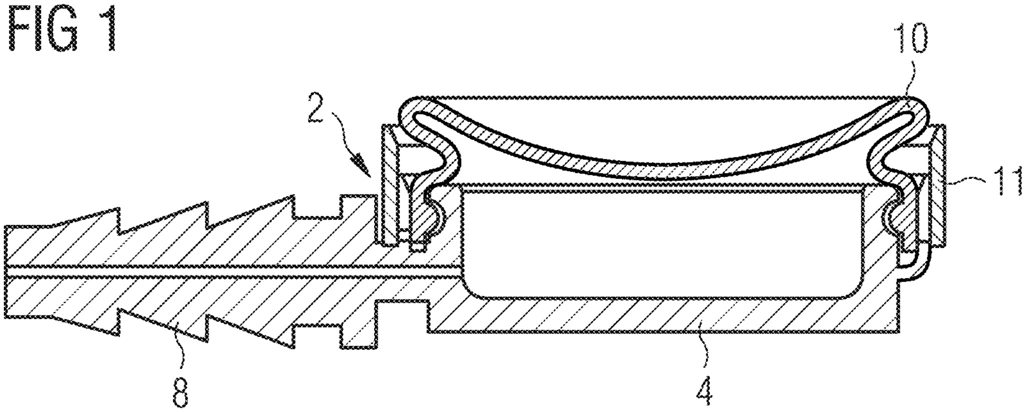

U.S. PATENT DOCUMENTS 5,082,326 A * 1/1992 Sekido .................. B60N 2/885 297/284.6
5,865,418 A * 2/1999 Nakayama ........... G05D 23/026 60/528
6,116,569 A * 9/2000 Cox ...................... F16K 31/003 251/75
11,555,485 B2 * 1/2023 Koepfer ................ F03G 7/0633
2004/0222938 A1 * 11/2004 Gierow .................. H01Q 1/081 343/872
2006/0218731 A1 * 10/2006 Muhl ................. B65G 69/2817 14/71.3
2007/0023089 A1 * 2/2007 Beyerlein ............. F16K 31/002 137/596.17
2007/0277877 A1 * 12/2007 Ghorbal ................ F16K 31/002 251/336
2011/0227388 A1 * 9/2011 Bocsanyi ............... B60N 2/914 297/452.41
2015/0251179 A1 * 9/2015 Asai .................... F16K 99/0038 60/527
2016/0018016 A1 * 1/2016 Dankbaar ................. F16K 7/12 251/129.01
2018/0038514 A1 * 2/2018 Kuszneruk .......... F16K 99/0044
2018/0055230 A1 * 3/2018 Cheng .................... A47C 7/467
2018/0105080 A1 * 4/2018 Dry ...................... B60N 2/3075
2018/0355991 A1 * 12/2018 Pfahler .................. B60N 2/914
2019/0000247 A1 * 1/2019 Ko ....................... B60N 2/7094
2019/0126799 A1 * 5/2019 Lem ....................... B60N 2/976
2019/0353266 A1 * 11/2019 Dörfler .................. B60N 2/914
2019/0353268 A1 * 11/2019 Dörfler .................. B60N 2/914
2019/0353270 A1 * 11/2019 Dörfler ................... F16K 31/02
2020/0103047 A1 * 4/2020 Beuschel .............. F16K 31/025
2021/0172533 A1 * 6/2021 Rodgers ................. B01D 46/10
2021/0402902 A1 * 12/2021 Dörfler ................. F16K 31/002
2022/0205551 A1 * 6/2022 Nicola .................... F16K 11/22
2022/0243827 A1 * 8/2022 Nicola .................. F16K 31/025
2023/0125583 A1 * 4/2023 Pagel .................... F16K 31/025 137/625.48

* cited by examiner

LIFTING ELEMENT AND ADJUSTMENT DEVICE

CROSS-REFERENCE TO RELATED APPLICATIONS

This application is a continuation of co-pending U.S. patent application Ser. No. 16/833,996, filed Mar. 30, 2020, and claims benefit to German Patent Application Number 20 2019 101 901.8, filed Apr. 2, 2019, and German Patent Application Number 10 2020 107 952.4, filed Mar. 23, 2020, which are both incorporated in their entireties by reference herein.

TECHNICAL AREA

The disclosure relates to a valve element, a distributor element, a lift element, a lift element arrangement, an adjusting device, an adjusting arrangement, a seat, a vehicle and an antenna with such a lift element.

BACKGROUND

According to the state of the art, lift elements are known in automotive and industrial applications, where they are used as actuating elements. Such lift elements are especially configured as pneumatic lift elements. In a pneumatic lift element, a pressure drop can be compensated by additional pumping and, in contrast to a hydraulic lift element, leaks do not lead to undesired contamination. In the known lift elements, a pump can supply most lift elements with pressure. Typically, a central valve assembly is arranged between the pump and the lift elements, so that the latter are individually controlled by the valve assembly. Currently, the pressure is therefore built up in the lift element and supply line between the valve assembly and lift element. The lift elements and supply lines must generally be laid individually, which generates relatively high laying costs, and this also increases error susceptibility. In addition, a central valve assembly needing a lot of space must be arranged.

To hold or restore the position by additional pumping, a pressure sensor is necessary in the execution described above.

SUMMARY

The task of the disclosure is to eliminate the disadvantages according to the state of the art. In particular, an improved valve element, a distributor element, a lift element, a lift element arrangement, an adjusting device, an adjusting arrangement, a seat, a vehicle and an antenna with such a lift element should be specified.

The object of the disclosure is solved by the described and depicted subject matter with regard to the valve element, with regard to the distributor element, with regard to the lift element, with regard to the lift element arrangement, with regard to the adjusting device, with regard to the adjusting arrangement, with regard to the seat, with regard to the vehicle, and with regard to the antenna. Useful embodiments result from other detailed aspects of the disclosure.

The valve element according to the disclosure comprises an actuator with an SMA wire, a return spring and a first sealing element. In an execution as 3/3-way valve, the valve includes a first and a second sealing element on each actuator equipped with an SMA wire and a return spring to either seal off a first or second opening. The actuator or actuators extend from a base plate that can have a circumferential sealing and are in each case fixed in place to the base plate with a first fastening element. In particular, the actuator or actuators extend essentially perpendicularly away from the base plate, i.e. an extension direction of the actuator forms a maximum ±30° angle with a surface normal of a base plate. Expediently, the actuator or actuators have in each case a second fastening element connected to the respective first fastening element by a spring, especially a leaf spring. Expediently, the first and second sealing elements are arranged on a side of the respective second fastening element, i.e. on the head side, that faces away from the base plate. The aforementioned arrangement of the sealing elements on the side facing away from the base plate makes an especially space-saving arrangement possible.

The valve element is suitable for installation in a lift element, valve housing or distributor housing.

The valve element can be housed in a distributor housing, especially as valve housing, especially in a T-distributor, and thus form a distributor element. The distributor housing can be especially executed in a cuboid shape. For this, the distributor housing has an opening, which can be tightly closed by the base plate of the valve element. The distributor housing has a first housing connection, a second housing connection and, expediently, a third housing connection. In particular, the first housing connection can be an opening to a surrounding area, the second housing connection can have a branched connection, and the third housing connection can be designed as individual connection. The branched connection can especially have two connecting elements for hose or pipe connections that are expediently directly fluidically connected to one another and connected together to a housing opening of the second housing connection. This second housing connection can have a T-shaped design. The third housing connection also has expediently a connecting element for a hose or pipe connection. Expediently, both the first and second connection can be sealed off with a sealing element of a valve element on the inner side of the distributor housing.

Expediently, the first and second housing connection is arranged on a first side wall of the housing. This first side wall lies especially opposite the base plate and is designed for the sealing elements of the valve element arranged on the head side. The third housing connection is expediently arranged on a second side wall standing perpendicularly to the first side wall, especially on the smaller of the vertically upright side walls of a cuboid. Expediently, the connecting element of the third housing connection is aligned parallel to one of the connecting elements of the second housing connection and/or normally to the second side wall. Such a distributor element can be especially assigned in each case to a lift element of a lift element arrangement described below. Furthermore, such a distributor element is suitable for use as valves for a lumbar or massage device in a seat, especially a vehicle seat, with numerous lumbar or massage bubbles for the space-saving arrangement.

The lift element according to the disclosure comprises a body that has at least one opening and a first connection, and a flexible element that tightly closes the opening of the body, wherein the flexible element is movable from a lowered position and a lift position by increasing or decreasing a fluid volume in the body connected to the flexible element, wherein the first connection is provided with a valve.

The body is particularly a rigid body, which can be especially made of plastic. The body can be made by injection molding, for example. Such a body has especially a cuboid or cylindrical shape executed with a closed bottom side. The first connection is a fluid connection, especially an inlet. The first connection can be arranged on a side wall of the body or on the bottom, and is especially suitable for connecting a supply line in form of a hose, for example, which is or can be in turn connected to a pump. The opening of the body is especially arranged on the side of the body opposite to the bottom. Here, the opening can extend fully or partially over this side. The flexible element is expediently attached to the opening of the body with a locking element, so that the flexible element seals off the opening of the body. Alternately, the flexible element can also be manufactured as one single piece with the body by multi-component injection molding, for example, especially by two-component injection molding. In this execution, no locking element is needed. The flexible element can be a silicone or latex molded part, for example.

In the lift element according to the disclosure, the valve is arranged in the body of the lift element or in the first connection of the lift element, so that the first connection of the lift element can be closed or released. As a result of that, error susceptibility is reduced because leaks in the feed or supply line area have a lesser impact. Moreover, a central valve assembly can be dispensed with. Expediently, the valve or body has an electric contact for controlling the valve. If the lift element is combined with the distributor element described above, the lift element can also be used with a valve connected upstream at the first connection.

Expediently, since the fluid is air, the lift element is a pneumatic lift element.

The flexible element is particularly a membrane or a membrane with a bellows. A simple membrane is appropriate if only a slight lift should be generated with the lift element. A bellows can include one or several folds, so that various lift heights can be attained depending on the number and depth of the folds. If the lifting height is significant, lateral guiding could be considered under certain circumstances to increase mechanical stability in the lifting state.

In the embodiment, the valve provided with the first connection is housed in the body. In particular, the valve is arranged on an inner side of the body in extension of the first connection. The valve can be a 3/2-way valve or a 3/3-way valve.

In the embodiment, the body includes one outlet, wherein the valve is arranged in a way to close the first connection and the outlet alternately and/or simultaneously. Expediently, the outlet is designed as second connection so it can be connected to a hose or pipe element, for example.

Expediently, the valve comprises an actuator with an SMA wire, a return spring and a first sealing element. Especially if executed as 3/3-way valve, the valve comprises a first and second sealing element to optionally seal off the first connection and the outlet. A valve element described above as valve can be especially housed in the body.

In another embodiment, the lift element comprises a bistable folding mechanism that in each case fixes the flexible element in place in the lowered position and in the lift position. The folding mechanism can be, for example, a bent sheet metal, a clamp or the like, with two stable positions that is only moved by an external, especially mechanical, force to the other position. Between these stable positions, the folding mechanism is in an unstable state. This embodiment has the advantage that a slight pressure drop in the lift element does not change the preset position.

The lift element arrangement according to the disclosure comprises at least two lift elements according to the disclosure, wherein the lift elements are connected in each case to the first connection with a supply line, which is or can be connected to a pump, and the valve of each lift element is separately controlled.

Expediently, the lift elements are arranged on a carrier, wherein the carrier is one single piece and has optional recesses. The carrier is, for example, a foil carrier, made especially from a plastic foil.

In the embodiment, the carrier comprises the supply lines and/or electrical connections. Hence, electrical wiring is integrated into the carrier. Connectors can be provided in the positions foreseen for the lift elements for plugging in and contacting the lift elements. Furthermore, a common electrical connection can be provided on the carrier with which the lift element arrangement can be contacted and can also be connected to a control device, for example. Clips or grooves, for example, on or in which separate lines can be laid can be provided on the carrier for the supply lines. In addition, supply lines formed integrally with the carrier can also be provided. Alternately, the carrier can also include the distributor elements described above.

The adjusting device comprises a lift element according to the disclosure and an adjuster as well as a spring element pressing against the flexible element of the lift element or a first lift element according to the disclosure with a flexible element on whose side facing away from the body an adjuster is arranged, wherein the adjuster is simultaneously arranged on a flexible element of a second lift element according to the disclosure opposite it. Thus, in the first case, the lift element works against the spring tension of the spring element; in the second case, the lift elements opposite one another are antagonistically controlled. Such an adjusting device can furthermore comprise a housing, in which the lift element or elements house the adjuster and, if necessary, the spring element. In an execution with two lift elements, a common electrical connection and/or a common compressed air connection or fluidic connection can be present.

The adjusting arrangement according to the disclosure comprises several adjusting devices according to the disclosure. Such an adjusting arrangement can include, for example, three adjusting devices with two lift elements in each case. Such an adjusting arrangement is expediently arranged in a common housing and can include a guiding element for the adjusters. Furthermore, such an adjusting arrangement has expediently a common pressure connection and a common electrical connection for control and energy supply.

The vehicle according to the disclosure, especially a motor vehicle, comprises a previously described lift element or lift element arrangement or adjusting arrangement to adjust a surface element. In particular, such a surface element can be a car body part like a fender, spoiler, etc., an interior trim part or dashboard area, a bracket for a camera or a mirror, an armrest, or a seat described below, for example.

The seat according to the disclosure, especially a vehicle seat, comprises one or several lift element arrangements according to the disclosure. Such a lift element arrangement can be installed, for example, in armrests for vehicle seats in order to adjust them easily and comfortably. Alternately, lift elements can be used, for example, to adjust the height and inclination of the seat.

The antenna according to the disclosure has at least one adjusting arrangement according to the disclosure. Such an adjusting arrangement can be especially used to adjust the orientation of sender and/or receiver.

SHORT DESCRIPTION OF THE DRAWINGS

The disclosure will now be explained in more detail with reference to the attached drawings.

Figure 2A:
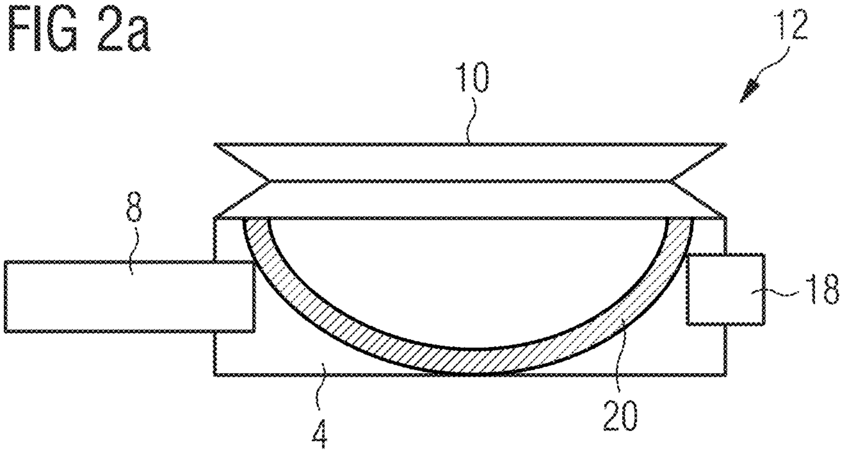
Figure 2B:
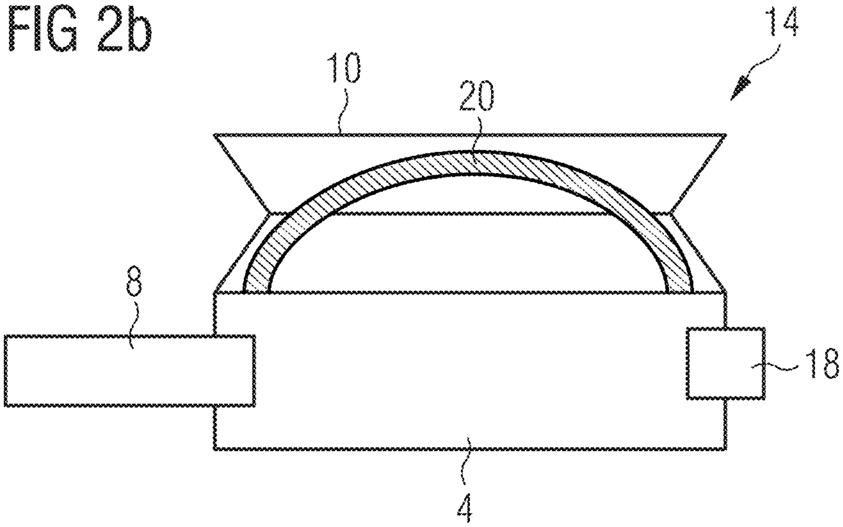
Figure 3A:
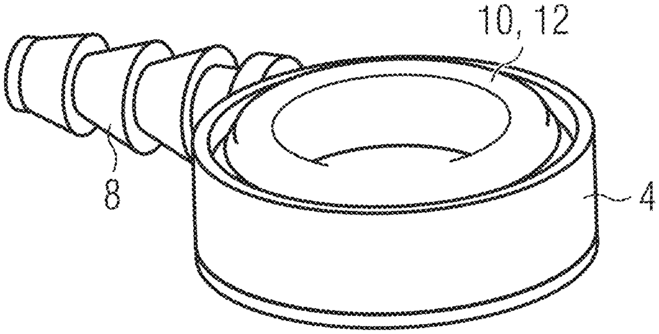
Figure 3B:
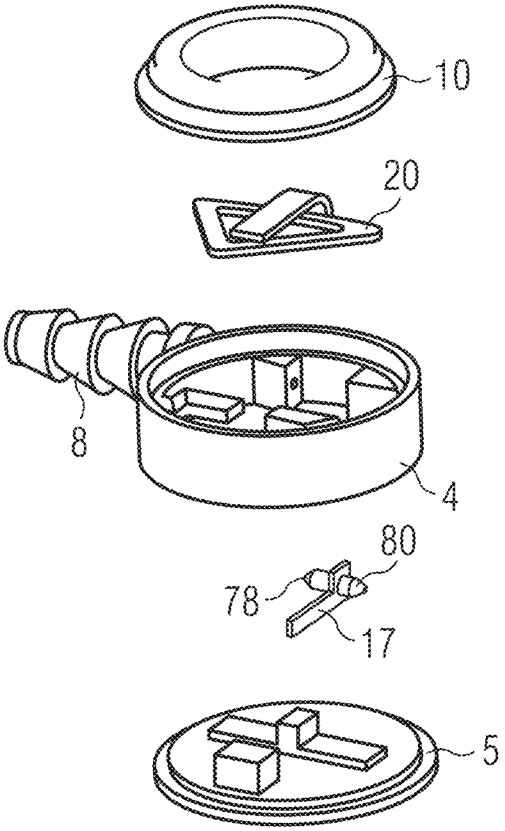
Figure 3C:
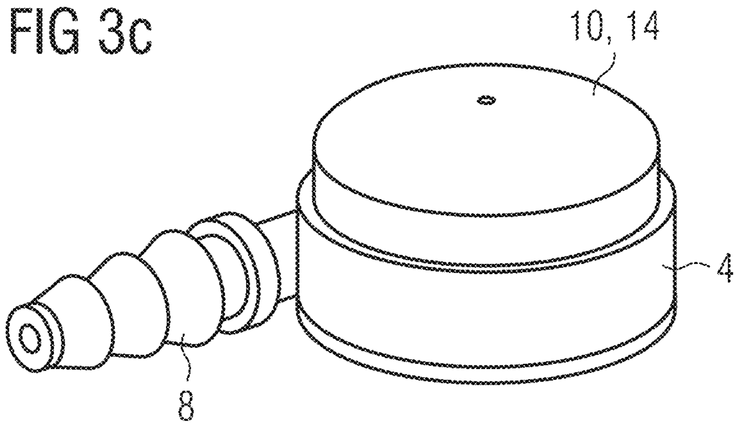
Figure 3D:
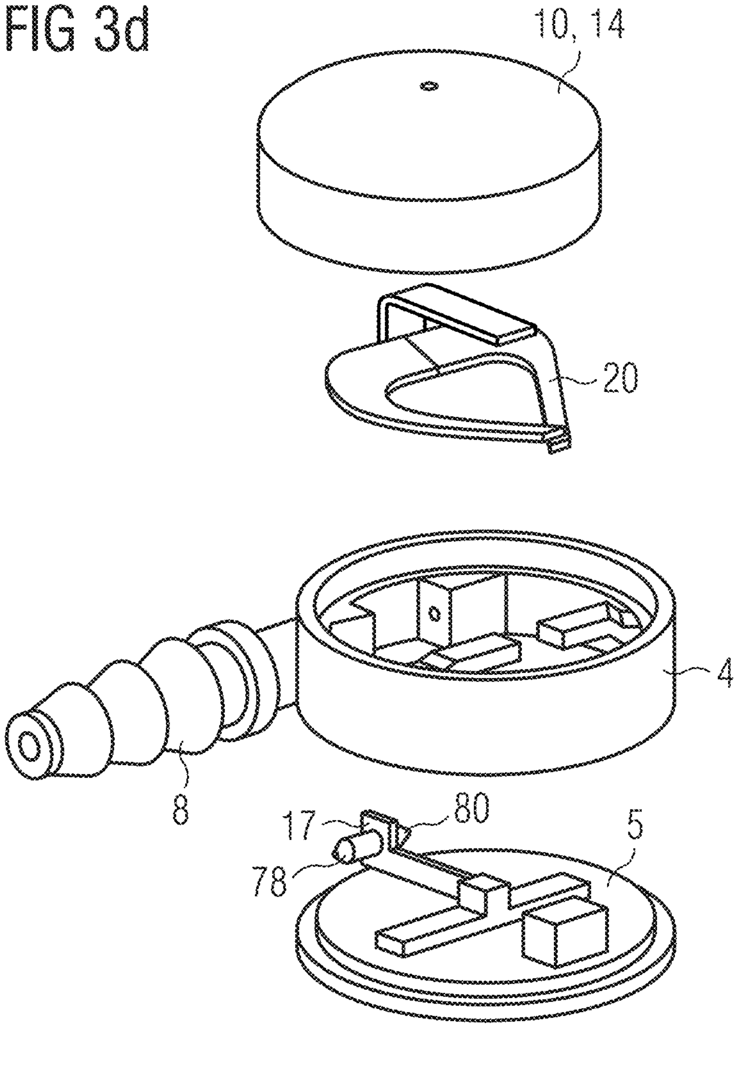
Figure 4A:
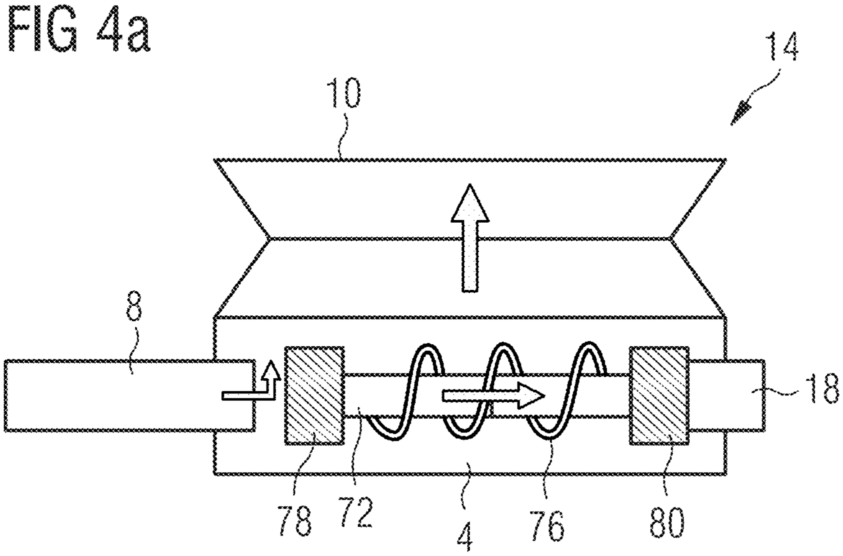
Figure 4B:
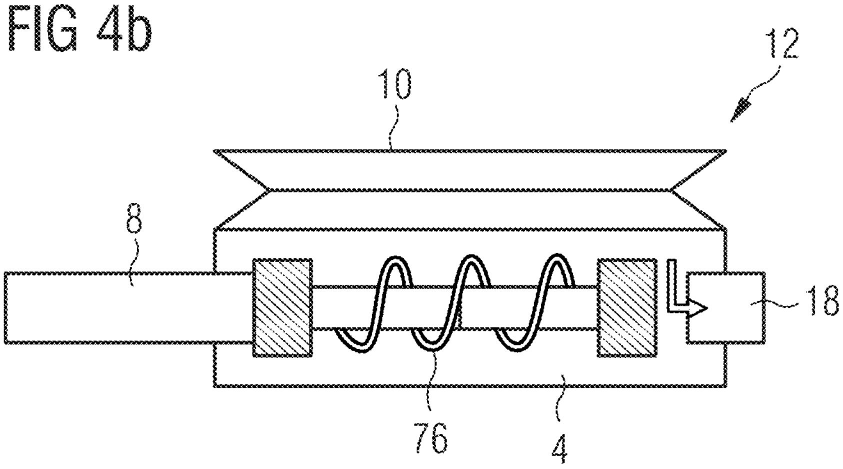
Figure 5A:
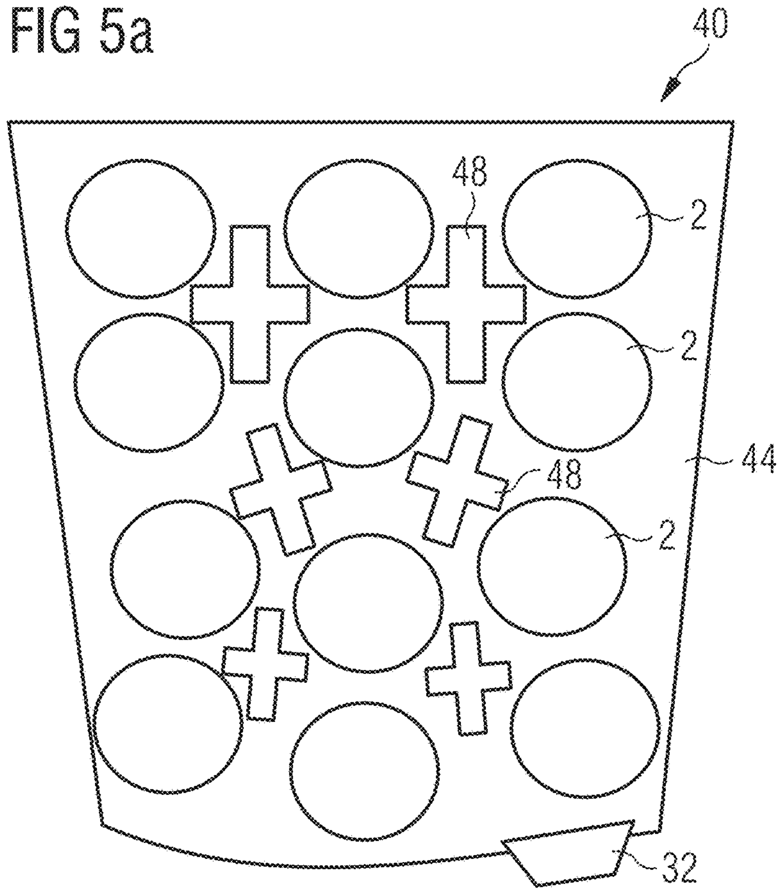
Figure 5B:
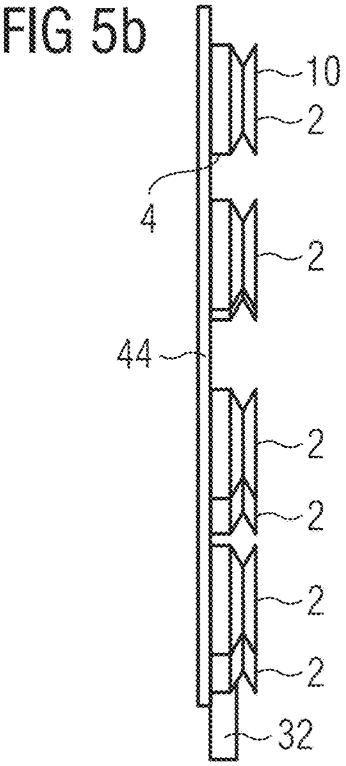
Figure 6A:
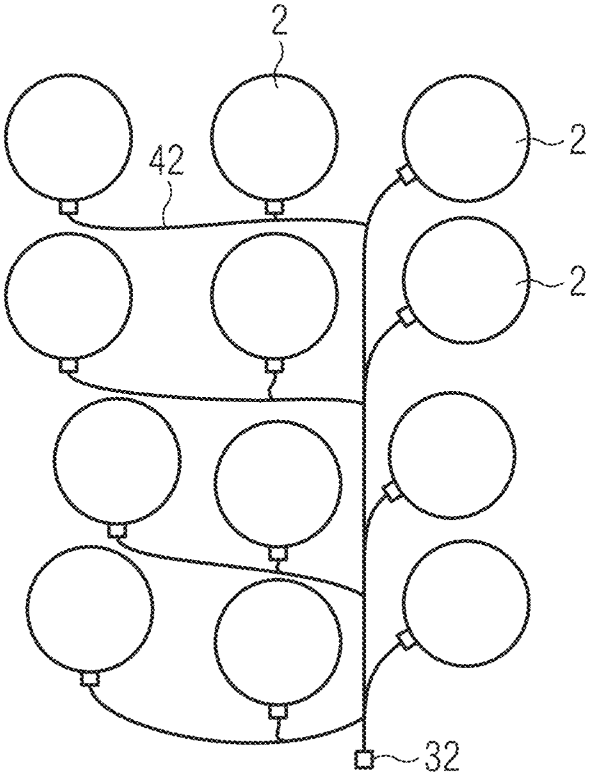
Figure 6B:
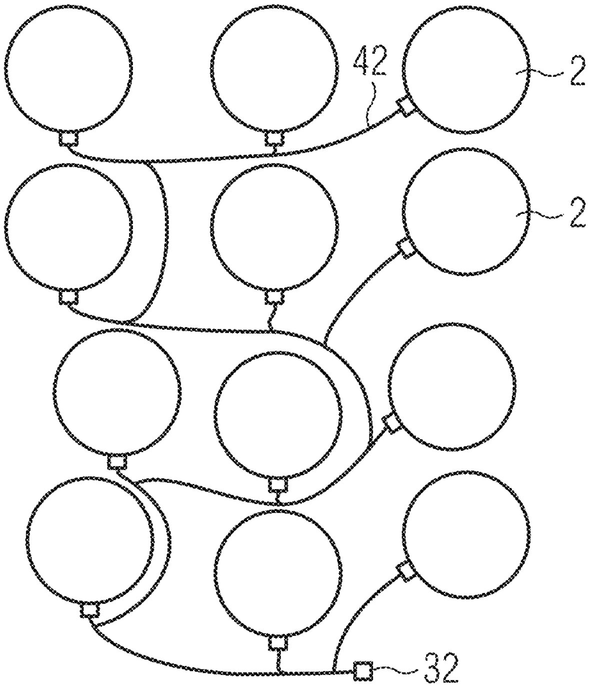
Figure 7A:
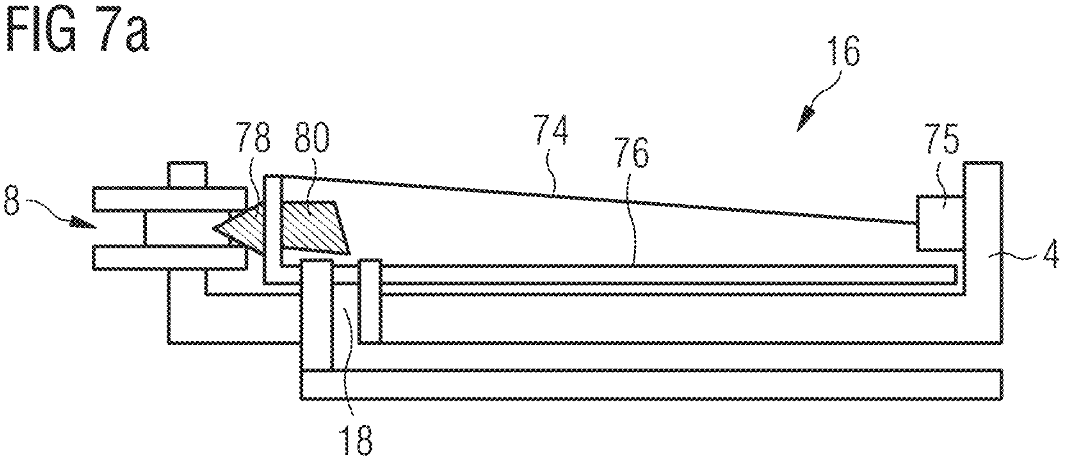
Figure 7B:
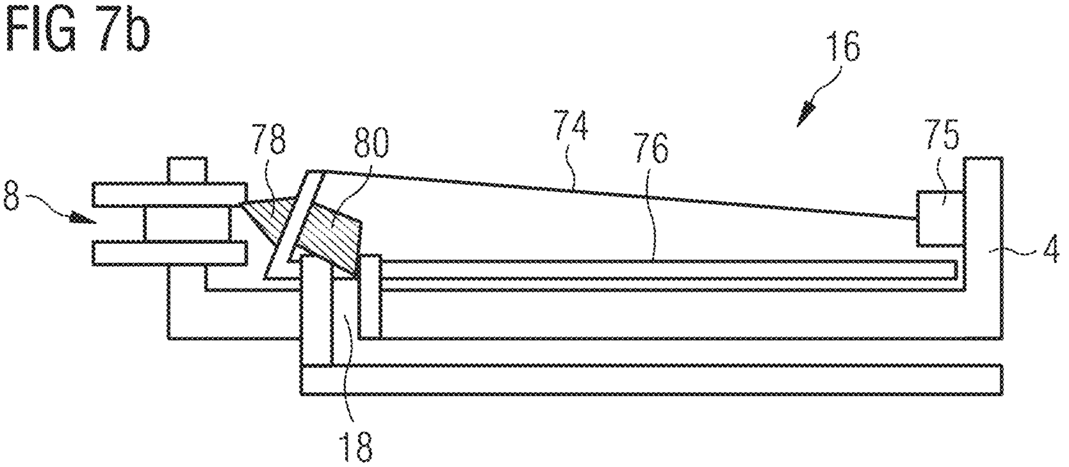
Figure 8A:
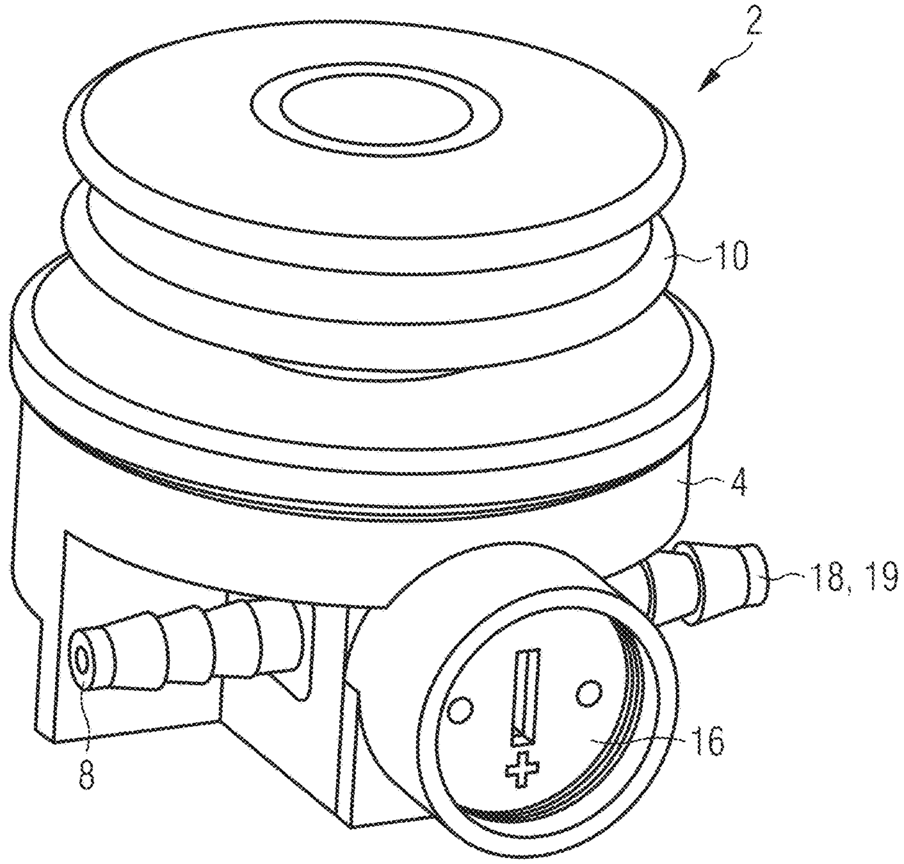
Figure 8B:
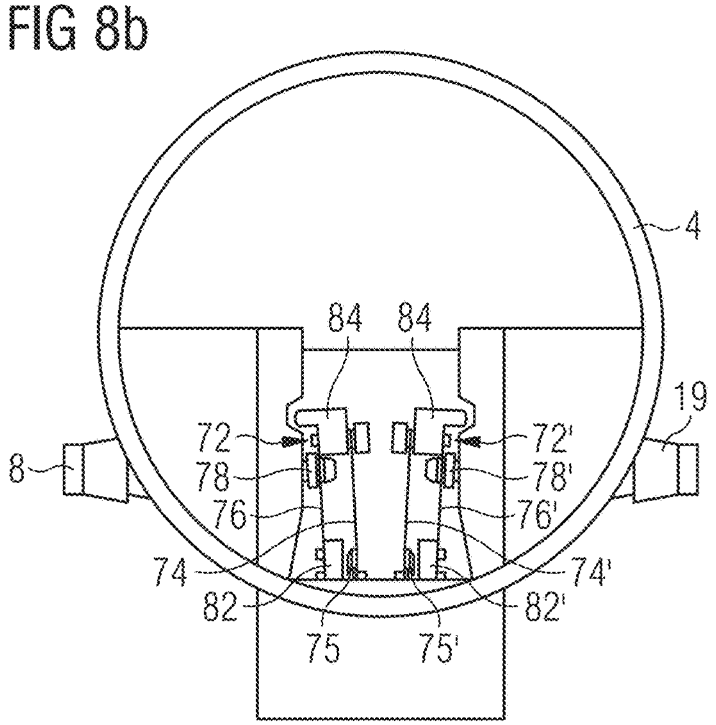
Figure 8C:
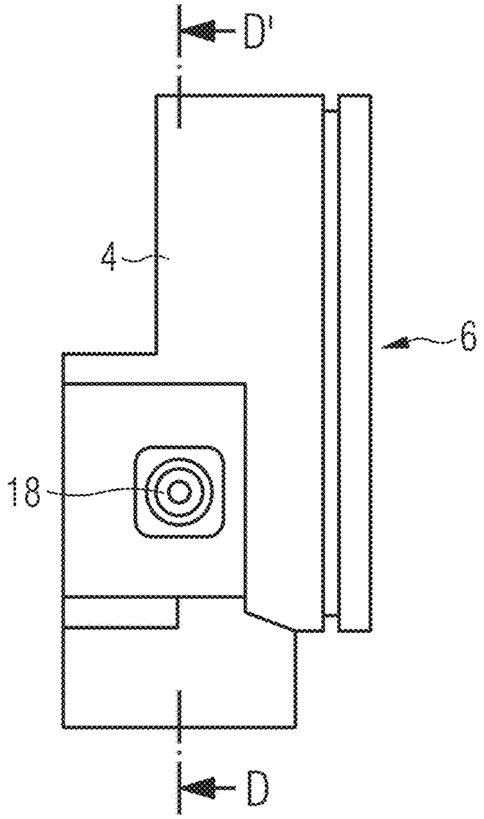

FIG. 1 shows a view of a cross section through a lift element;

FIG. 2*a* shows a lift element with folding mechanism in the lowered position;

FIG. 2*b* shows a view of a lift element with folding mechanism in the lift position;

FIG. 3*a* shows a view of a lift element in lowered position;

FIG. 3*b* shows an exploded view;

FIG. 3*c* shows a view of a lift element in lift position;

FIG. 3*d* shows an exploded view;

FIG. 4*a* shows a schematic representation of a lift element with 3/2-way valve in lift position;

FIG. 4*b* shows a schematic representation of a lift element with 3/2-way valve in lowered position;

FIG. 5*a* shows a top view of a foil carrier with lift elements;

FIG. 5*b* shows a side view of a foil carrier with lift elements;

FIG. 6*a* shows a view with lift elements, arranged with a tree-shaped supply line;

FIG. 6*b* shows a view with lift elements, arranged with a ring supply line;

FIG. 7*a* shows a detailed view of a valve with the lift element in lift position;

FIG. 7*b* shows a valve with the lift element in lowered position;

FIG. 8*a* shows a perspective view of a lift element;

FIG. 8*b* shows a view of the lift element body of the hub element from FIG. 8*a* with valve;

FIG. 8*c* shows a side view of the lift element from FIG. 8*a;*

Figure 8D:
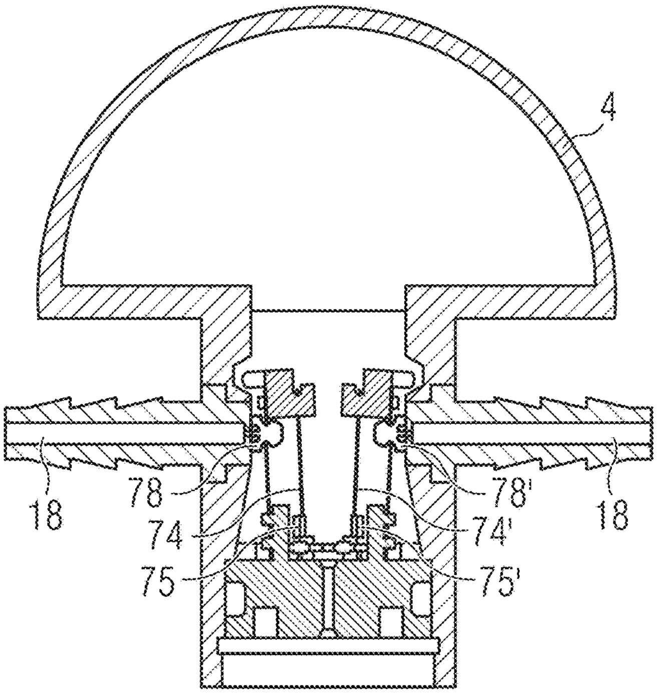
Figure 9A:
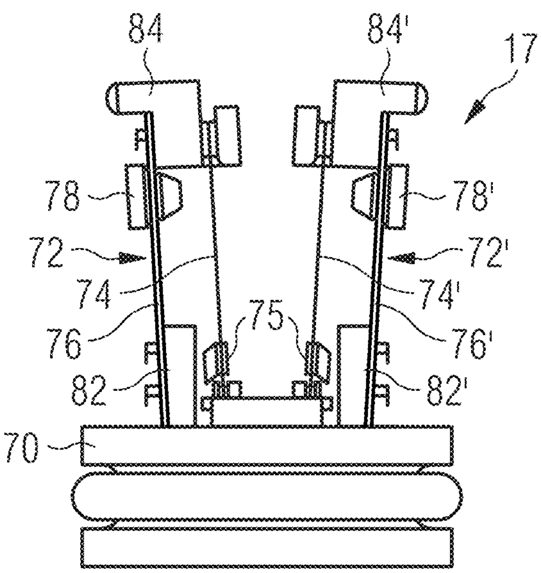
Figure 9B:
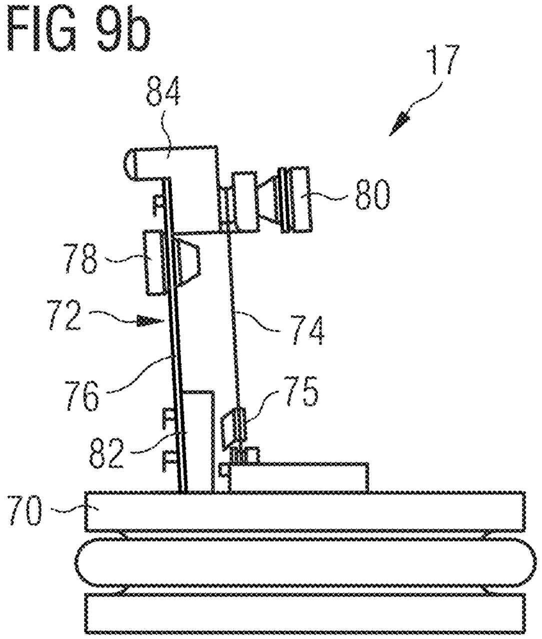
Figure 9C:
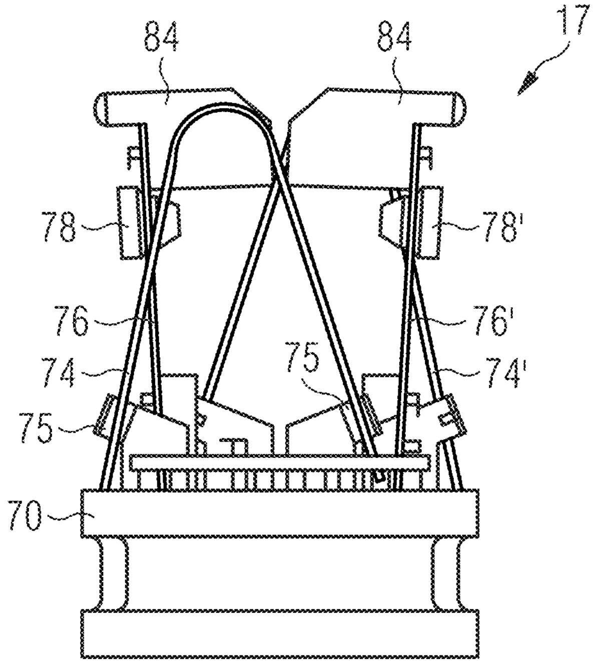
Figure 9D:
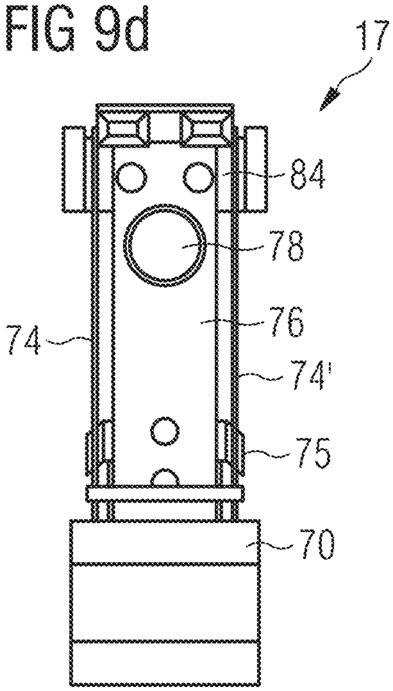

FIG. 8*d* shows a section along D-D';

FIG. 9*a* shows a view of a first embodiment of a valve insert for a 3/3-way valve;

FIG. 9*b* shows a view of a first embodiment of a valve insert for a 3/2-way valve;

FIG. 9*c* shows a view of second embodiment of a valve insert for a 3/3-way valve;

FIG. 9*d* shows a side view of the embodiment from FIG. 9*c;*

Figure 9E:
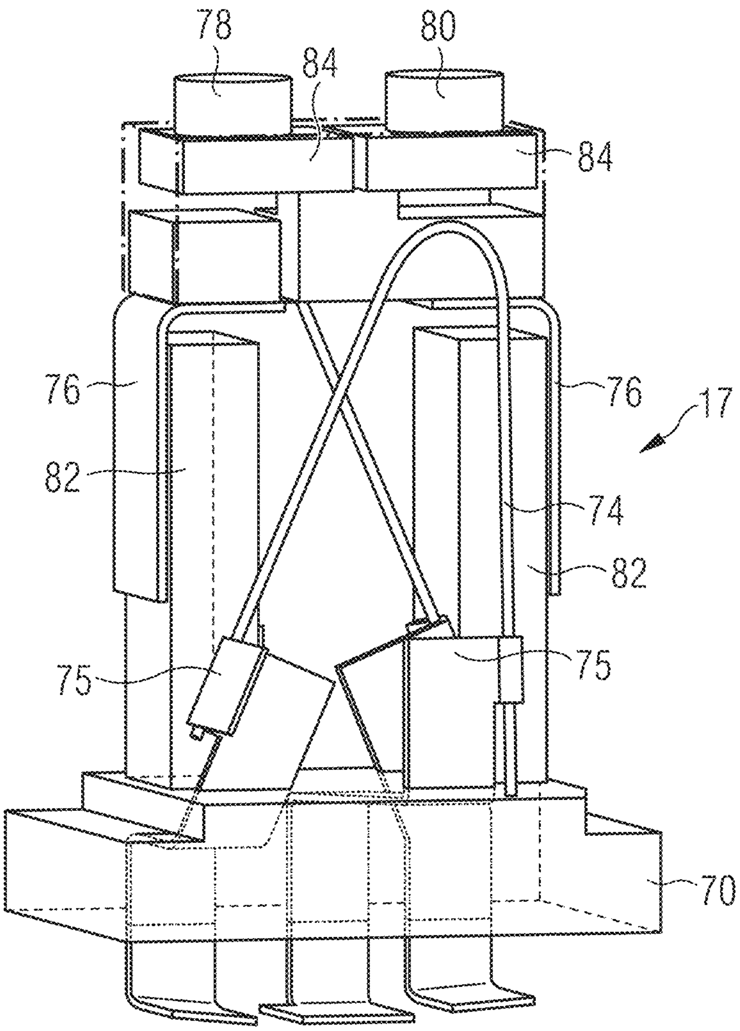
Figure 10A:
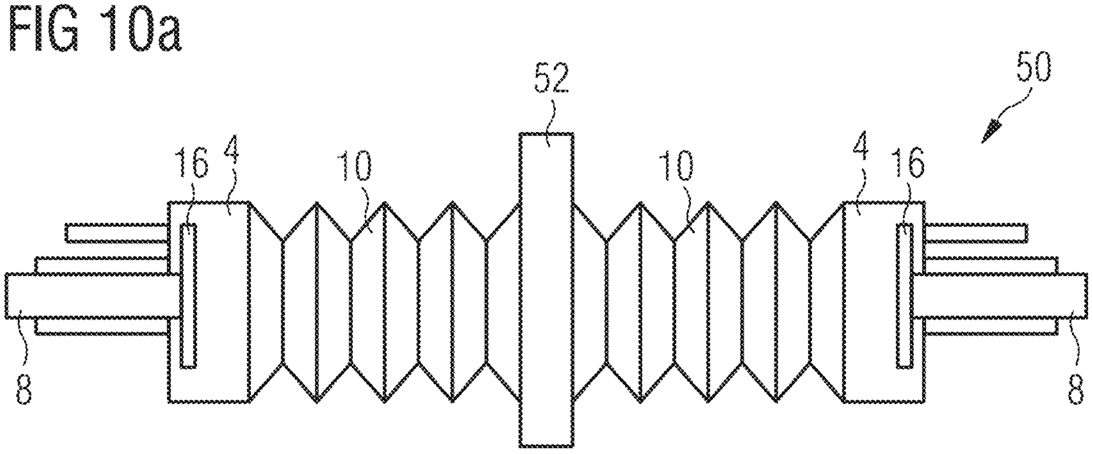
Figure 10B:
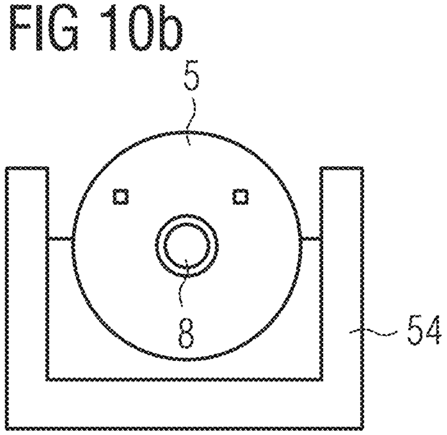
Figure 11A:
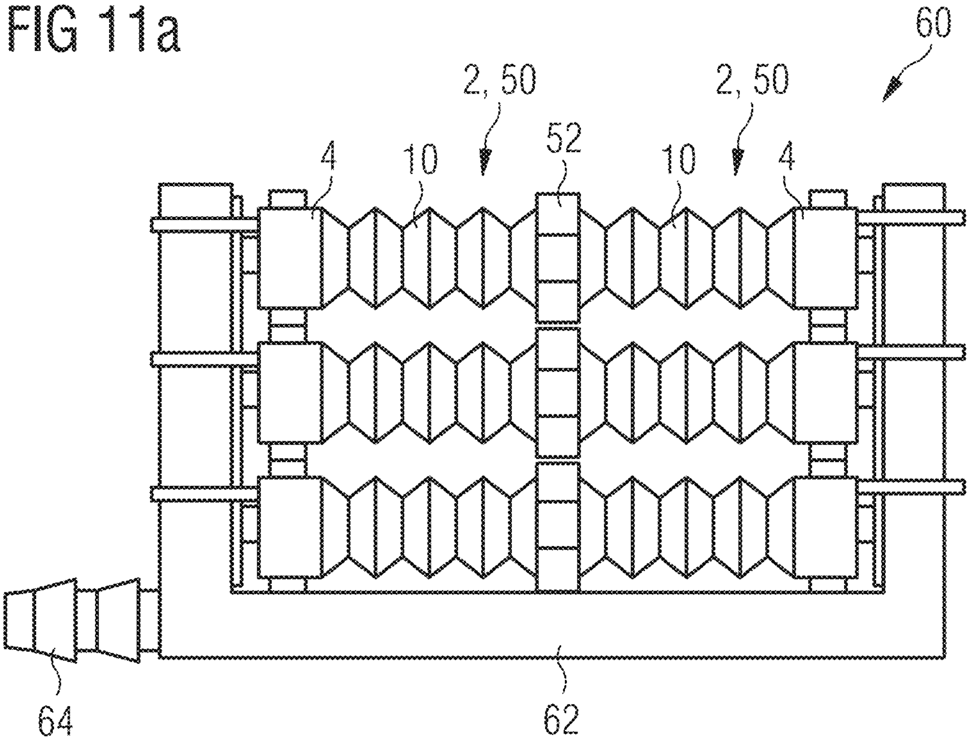
Figure 11B:
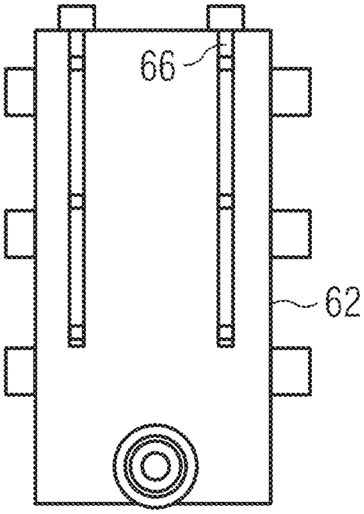

FIG. 9*e* shows a view of a third embodiment of a valve insert for a 3/3-way valves;

FIG. 10*a* shows a side view of an adjusting device;

FIG. 10*b* shows a front view of an adjusting device;

FIG. 11*a* shows a top view of an adjusting arrangement with antagonistically arranged lift elements in middle position;

FIG. 11*b* shows a side view of the adjusting arrangement; and

Figure 11C:
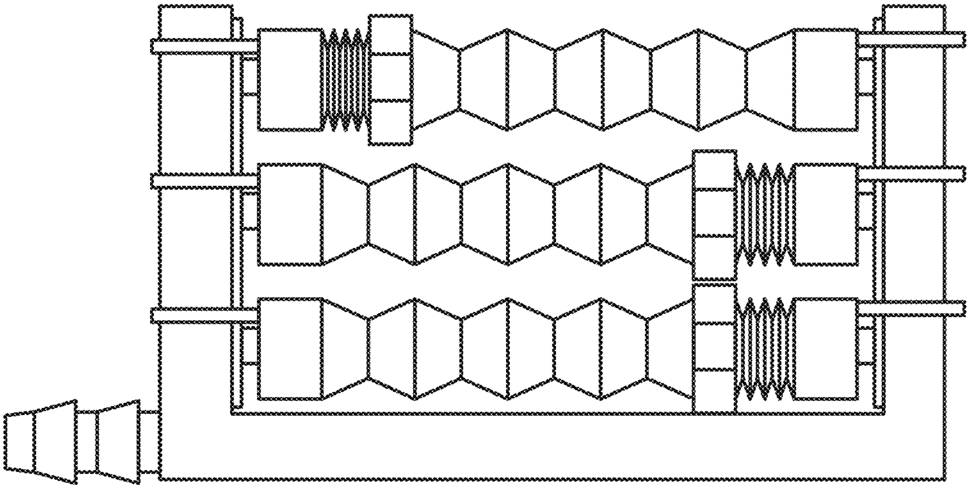
Figure 11D:
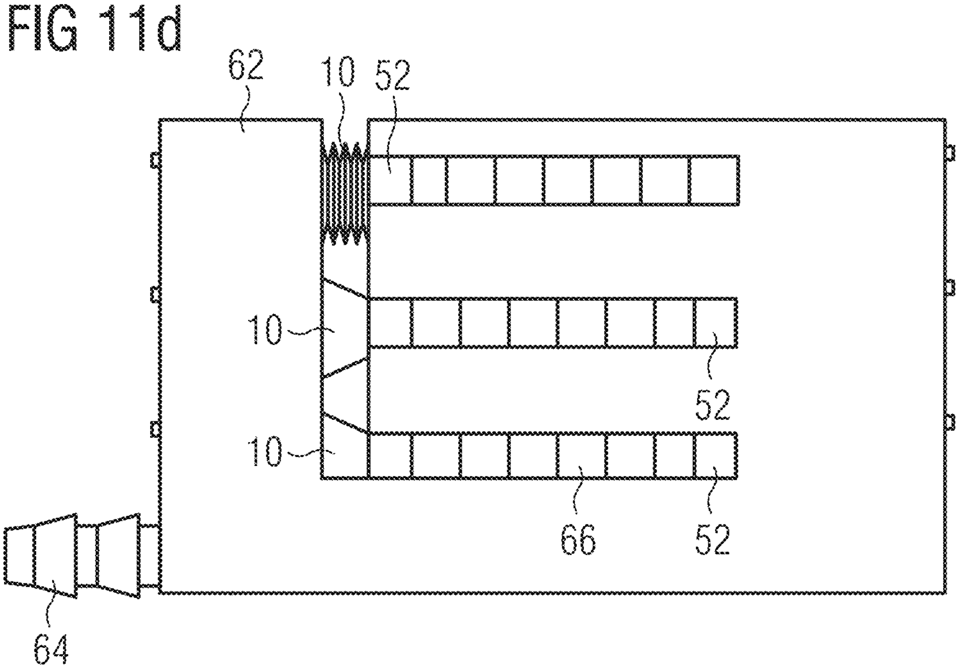
Figure 12B:
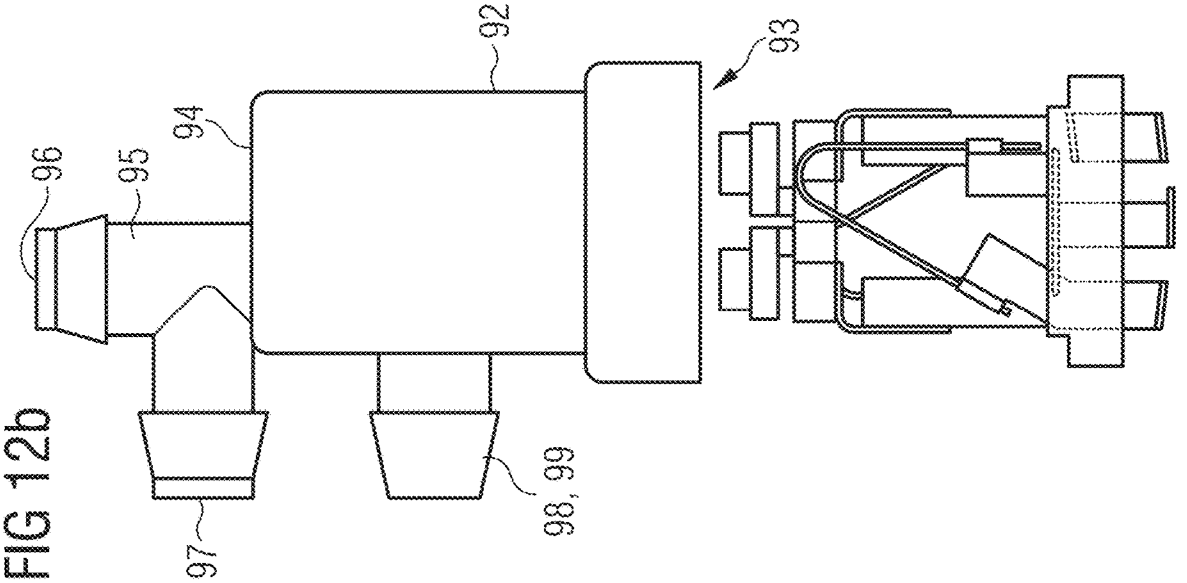
Figure 12A:
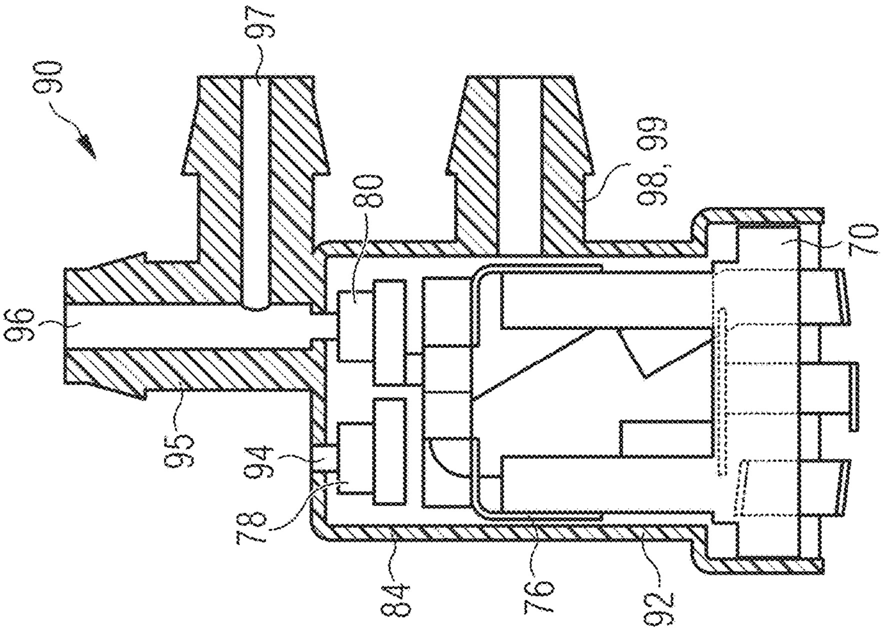
Figure 13A:
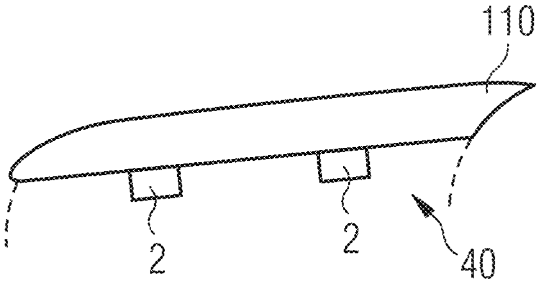
Figure 13B:
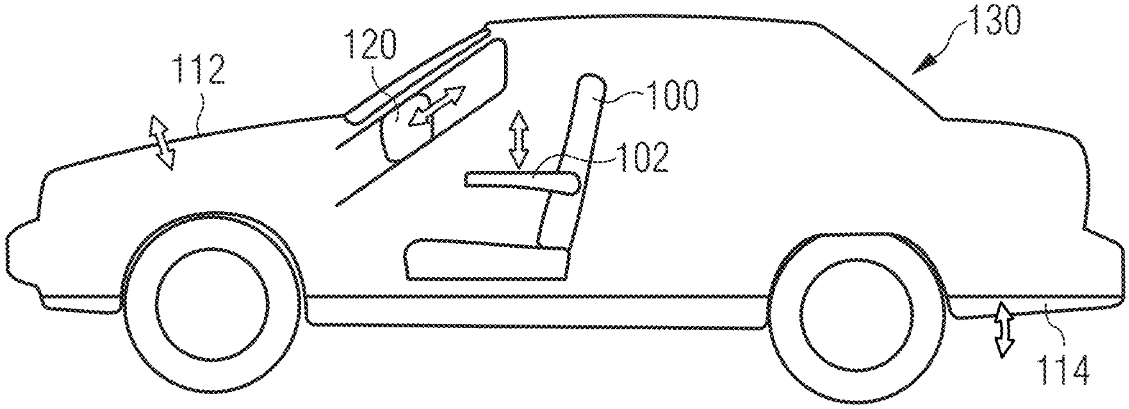

FIG. 11*c* shows a top view of the adjusting arrangement in deflected position;

FIG. 11*d* shows the adjusting arrangement with closed housing;

FIG. 12*a* shows a sectional view of a distributor element;

FIG. 12*b* shows an exploded view of a distributor element;

FIG. 13*a* shows a view of an adjustable vehicle surface with two lift elements; and FIG. 13*b* shows a schematic vehicle with various adjustable elements.

DETAILED DESCRIPTION

FIG. 1 shows a lift element 2 with a body 4. The body 4 has a cylindrical design and closed bottom. On a side opposite the bottom, a flexible element 10 has been arranged, held on the body 4 with a locking element 11. Laterally on the body, a first connection 8 comprising a valve 16 (not shown) is arranged. A pump can be connected to the lift element 2 via the first connection 8 in order to adjust a pressure in the lift element 2.

FIG. 2*a, b* shows an embodiment of the lift element 2 with a folding mechanism 20. Here, FIG. 2*a* shows the lift element 2 in lowered position 12 and FIG. 2*b* the lift element 2 in lift position 14. The body 4 of the lift element 2 comprises a first connection 8 and an outlet 18 executed as second connection. In the lowered position 12, the folding mechanism 20 is bent downwards; in the lift position 14, the folding mechanism 20 is bent upwards, so that the flexible element 10 remains in the lift position 14 even if there is a slight loss of internal pressure in the lift element 2.

FIG. 3*a-d* shows another embodiment of the lift element 2. FIG. 3*a* shows a perspective view of the lift element in lowered position 12. FIG. 3*b* shows an exploded view belonging to FIG. 3*a*. Here, the body 4 is closed at the bottom with a bottom 5 and at the top with the flexible element 10. The first connection 8 is arranged on the side of the body 4. The body 4 includes a 3/2-way valve with a valve element 17. An SMA element can be provided to activate the valve element 17. The valve element 17 is used in the body 4 with a first sealing element 78 and a second sealing element 80 in extension of the first connection 8. The folding mechanism 20 comprises here a bistable element whose flap is tilted downwards in the lowered state. FIG. 3*c* shows the lift element 2 in the lift position 14. FIG. 3*d* shows the associated exploded view, in which the bistable element is seen in the second position that fixes the lift position 14 in place. In doing so, the flap is tilted upwards.

FIG. 4*a* now shows a lift element 4 with an open 3/2-way valve to allow compressed air to flow in. The valve 16 comprises an actuator 72 with a first sealing element 78 and a second sealing element 80. Furthermore, the valve 16 comprises a return spring 76. In the execution shown, the return spring 76 has been designed in such a way that the valve 16 is moved back to the position in which the first connection is normally closed. The first sealing element 78 oriented towards the first inlet 8 remains open, whereas the second sealing element 80 oriented towards the outlet 18 tightly closes the outlet 18. Hence, when the pump is connected, the pressure in the lift element 2 increases and the flexible element 10 is pressed upwards.

FIG. 4*b* shows the lift element 2 from FIG. 4*a*, but with a valve position in which the valve 16 tightly closes the first connection 8 and releases the outlet 18. The pressure in the lift element 2 is reduced here, so that the lift element 2 is moved to the lowered position.

FIGS. 5*a* and *b* show a top view of a lift element arrangement 40 and a side view. The lift element arrangement 40 comprises numerous lift elements 2 arranged on a foil as carrier 44. The carrier 44 can have openings 48. The carrier 44 has a connection device 32. Furthermore, the carrier 44 comprises supply lines 42 (not shown) to supply the individual lift elements 2 with compressed air. The supply lines 42 are connected to the first connection 8. In addition, the carrier 44 houses electrical connections 46 through which the lift elements 2 can be controlled. Electrical lines can also be housed in the carrier 44. The supply lines 42 can be executed as a tree-like branched structure, especially as shown in FIG. 6*a*, or as ring line, as shown in FIG. 6*b*. The lift element arrangement 40, which can be easily laid on the carrier 44, is especially suitable for use in vehicle seats or in the vehicle body to adapt car body parts to aerodynamic conditions.

FIGS. 7*a* and *b* show a detailed view of a lift element 2 that schematically represents a valve 16. The valve 16 is housed in the body 4 and arranged in such a way that it can tightly close the first connection 8 with the first sealing element 78 or the second connection 19 with the second sealing element 80 of the outlet 18. The valve comprises an actuator 72 with a return spring 76 on which the first and second sealing element 78, 80 are arranged. The return spring 76 is executed as leaf spring with two legs. By means of a wire 74 from a shape memory alloy (i.e. an SMA wire), the first sealing element 78 or the second sealing element 8 can be moved to the sealing position. FIG. 7*a* shows the closing position of the first connection 8, in which the SMA wire is not energized. In FIG. 7*b*, the SMA wire has been shortened by the electric current. This opens the first connection 8 and tightly closes the outlet 18 or second connection 19.

FIG. 8*a* shows a perspective view of a lift element 2. The lift element 2 has a body 4 and a flexible element 10. The flexible element 10 is designed as a bellows.

The body 4 has a first connection 8 and an outlet 18 designed as second connection 19. The valve 16 is housed in an opening arranged between the two connections 8, 19. The structure of the body 4 is shown in the top view of FIG. 8*b* or as section along D-D according to FIG. 8*c* in FIG. 8*d*. Here, the first connection 8 and opposite it the second connection 19 can be seen. In between, the valve 16 is shown with its valve insert also in FIG. 9*a*. The valve 16 is designed here as 3/3-way valve with two actuators 72, 72'. Every one of the actuators 72, 72' is connected to a common base plate 70, which is provided with a circumferential seal for sealing off against the body 4. Every one of the actuators 72, 72' has a leaf spring 76, 76' mounted on the base plate 70 with a first fastening element 82.

A second fastening element 84 has been arranged on the opposite side of the leaf spring 76, 76'. A crimp connector 75 is located on the base plate 70. The second fastening element can be provided with another crimp connector 75 (not shown here). Between the crimp connector 75 on the base plate 70 and the crimp connector 75 on the second fastening element 84, there is in each case an SMA element 74. Alternately, the second fastening element has in each case a protrusion (as shown) with a U-shaped area around which the SMA element 74, 74' is guided. The SMA element 74, 74' is in each case arranged on the side of the connection 8, 19 assigned to it that faces away. Moreover, a first sealing element 78, 78' is arranged on the leaf spring 76, 76', which is in each case suited for closing the first or second connection 8, 19, respectively.

FIG. 9 shows various valve inserts as valve element 17 for a valve 16 that can be used in the body 4 or lift element 2 according to FIG. 8. Here, FIG. 9*a* shows the valve insert for the 3/3-way valve described above. FIG. 9*b* shows a valve insert for a 3/2-way valve that has only one actuator 72. On this one actuator 72, a first sealing element 78 and a second sealing element 80 are arranged on opposite sides. The SMA element 74 is arranged on the side of the second sealing element 80.

FIGS. 9*c* and 9*d* show an alternative embodiment of the valve insert from FIG. 9*a*. In this arrangement, the SMA elements 74, 74' are not arranged on the side opposite the first sealing element 78, 78', but are housed on a side arranged for this at an angle, especially right angle to it. The second fastening element 84 is designed accordingly different. The advantage of this embodiment is that the valve has a lower overall height.

FIG. 9*e* shows a third embodiment of the valve insert from FIG. 9*a*. In this arrangement, the sealing elements are not arranged on two sides opposite one another, but on the head side of the base plate 70 opposite one another. The main extension direction in the valve inserts shown in FIGS. 9*a-d* is the direction going from the first to the second fastening element along the leaf spring.

FIG. 10*a, b* shows an adjusting device 50, which comprises two lift elements 2 that have in each case one body 4 and one flexible element 10. Each flexible element 10 has a bellows design here. On the bottom 5, the body 4 has in each case a first connection 8, on which a valve 16 has been arranged in each case that can tightly close the first connection 8 and is therefore suitable for regulating the pressure in the lift element 2. An adjuster 52 is arranged between the flexible elements opposite one another. Here, the adjusting device is housed in a housing 54 or at least a partial housing, as shown in FIG. 10*b*, and can optionally have a guiding device 56 (not shown) for the adjuster 52.

FIG. 11*a-d* shows an adjusting arrangement 60 with six adjusting devices 50 arranged in two layers. Every one of the adjusting devices 50 comprises two lift elements 2 that face one another with the flexible elements 10. An adjuster 52 has been arranged between the flexible elements 10 opposite one another. The adjusting arrangements 50 are arranged in parallel in a housing 62, wherein the body 4 of each lifting device 2 points in each case to a housing wall. The housing 62 has a common pressure connection 64. Furthermore, the housing 62 has guiding rails 66, in which an adjuster 52 can be displaced lengthwise in each case. In FIG. 11*a*, all adjusters are in a middle position; in FIG. 11*c*, the adjuster of the first adjusting device 50 is shown to be fully displaced to the left, whereas the adjuster of the second and third adjusting device 50 is displaced to the right. FIG. 11*d* shows the adjusting arrangement 60 in a closed housing 62. The adjusters 52 can be displaced in the guiding rails 66, which serve as guiding device.

FIGS. 12*a* and *b* show an embodiment of a distributor element 90, which comprises a housing 92 having a cuboid design. The housing 92 has an opening 93 in which a valve element 17 can be used as valve insert. Here, the valve element 17 is a valve element 17 shown in FIG. 9*e*.

The valve element 17 has a base plate 70 with a circumferential seal. The seal of the base plate 70 tightly seals the opening 93 of the housing 92.

The housing 92 has a first housing connection 94, a second housing connection 95 and a third housing connection 98. The first housing connection 94 is executed as a through hole that can be tightly closed with a first sealing element 78. The second housing connection 95 is provided with a first connecting element 96 and a second connecting element 97, which extend perpendicularly to each other. The first connecting element 96 and the second connecting element 97 are constantly fluidically connected to one another. On the side facing away from the connecting elements 96, 97, the second housing connection 95 can be closed with the second sealing element 80 on the inner side of the housing 92.

A connecting element 99 is also arranged on the third housing connection 98. This connecting element 99 extends perpendicularly from the housing wall of the housing 92. In doing so, the second connecting element 97 and the connecting element 99 of the third housing connection 98 are arranged parallel to one another in the same direction. The first connecting element 96 of the second housing connection is arranged perpendicularly to the two others and extends away from the base plate 70.

FIG. 13*a* shows a surface element 110 of a vehicle 130 that can be adjusted with the lift elements 2. The lift elements 2 especially form a lift element arrangement 40. As shown in FIG. 5*a, b*, a carrier can be provided for such a lift element arrangement 40. The quantity of lift elements depends especially on the size of the surface element 110.

FIG. 13*b* shows a schematic view of a vehicle 130. This vehicle comprises a first car body part 112 and a second car body part 114 that can be arranged with a lift element, a lift element arrangement or an adjusting arrangement. It can be a car body part 112 in the upper area of the vehicle or also a car body part 114 in the floor area of the vehicle. Furthermore, the vehicle includes a seat 100 with an armrest 102. The armrest 102 can be adjusted (as shown) with at least one lift element, especially a lift element arrangement. Furthermore, a dashboard area 120 is shown, which can be adjusted with a lift element arrangement. The surface elements shown in FIG. 13*b* are merely exemplary.

LIST OF REFERENCE SIGNS

2, 2' Lift element
4 Body
6 Opening
8 First connection
10 Flexible element
11 Locking element
12 Lowered position
14 Lift position
16 Valve
17 Valve element
18 Outlet
19 Second connection
20 Folding mechanism
30 Pump
32 Connection device
40 Lift element arrangement
42 Supply line
44 Carrier
46 Electrical connections
48 Opening
50 Adjusting device
52 Adjuster
54 Housing
56 Guiding device
60 Adjusting arrangement
62 Housing
64 Pressure connection
66 Guiding rail
70 Base plate
72, 72' Actuator
74, 74' SMA wire
75 Crimp connector
76, 76' Return spring
78 First sealing element
80 Second sealing element
82 First fastening element
84 Second fastening element
90 Distributor element
92 Housing
93 Opening
94 First housing connection
95 Second housing connection
96 First connecting element
97 Second connecting element
98 Third housing connection
99 Connecting element
100 Seat
102 Armrest
110 Surface element
112 Car body part
114 Car body part
120 Dashboard area
130 Vehicle
200 Antenna

The invention claimed is:

1. A valve element for selectively sealing or opening two ports, the valve element comprising:

a base plate;

a first actuator attached to and extending from the base plate and a second actuator attached to and extending from the base plate; and the first actuator and the second actuator each including respectively a sealing element, an SMA wire, a return spring, a first fastening element, and a second fastening element, wherein in each of the first actuator and the second actuator:

the return spring is a leaf spring attached to the base plate via the first fastening element;

the second fastening element is attached to the return spring distally of the first fastening element;

the SMA wire is attached to the base plate and to the second fastening element so as to extend therebetween;

the sealing element is attached to the return spring so that, by selective activation of the SMA wire, movement of the return spring moves the sealing element between a position to seal one of the two ports and a position to open the one of the two ports.

2. The valve element of claim 1, wherein the base plate, the first fastening elements, the return springs, and the sealing elements are collectively configured so that the sealing elements are aligned at a common distance above the base plate.

3. The valve element of claim 2, wherein the base plate, the first fastening elements, the return springs, and the sealing elements are configured so that sealing surfaces of the sealing elements extend outwardly in opposite directions.

4. The valve element of claim 3, wherein the base plate, the first fastening elements, the second fastening elements, the return springs, and the SMA wires are configured so that the SMA wires are located inwardly of the return springs.

5. A distributor element with a valve element according to claim 1, further including a housing defining an opening configured to hold the valve element, the housing including at least a first housing connection and a second housing connection wherein the second housing connection can be closed by one of the sealing elements.

6. The distributor element according to claim 5, wherein the housing further includes a third housing connection, wherein the second housing connection includes a first connecting element and a second connecting element fluidically connected to one another permanently, wherein the third housing connection has a connecting element, wherein the second connecting element of the second housing connection and the connecting element of the third housing connection are aligned parallel to one another.

7. A lift element comprising:

a body defining an opening and a first connection; and a flexible element tightly closing the opening of the body, wherein the flexible element is movable between a lowered position and a lift position by changing a volume of a fluid in the body connected to the flexible element, and wherein the first connection includes a valve element according to claim 1.

8. The lift element according to claim 7, wherein the fluid is air.

9. The lift element according to claim 7, wherein the flexible element is one of a membrane or a membrane with a bellows.

10. The lift element according to claim 7, wherein the valve element is housed in the body.

11. The lift element according to claim 7, wherein the valve element is one of a 3/2-way valve or a 3/3-way valve.

12. The lift element according to claim 7, wherein the body further defines an outlet, wherein the valve element is configured so as to close the connection and the outlet at least one of alternately and simultaneously.

13. The lift element according to claim 7, further including a bistable folding mechanism fixing the flexible element in place in the lowered position and in the lift position.

14. A lift element arrangement including at least two lift elements according to claim 7, wherein each of the lift elements is connectable via a respective one of the first connections with a respective supply line which is connectable to a pump, and the valve element of each lift element can be separately controlled.

15. The lift element arrangement according to claim 14, wherein the lift elements are arranged on a carrier, wherein the carrier is one single piece and defines recesses.

16. The lift element arrangement according to claim 15, wherein the carrier includes at least one of the supply lines and/or electrical connections.

17. A vehicle seat including a lift element arrangement according to claim 14.

18. An adjusting device including a lift element according to claim 7, wherein an adjuster is arranged on a side of the flexible element facing away from the body, and the adjuster is simultaneously arranged on a flexible element of a second lift element oppositely disposed.

19. An adjusting arrangement including several adjusting devices according to claim 18.

20. An antenna including an adjusting arrangement according to claim 19.

21. A motor vehicle including a lift element according to claim 7.

* * * * *